United States Patent [19]
Aizawa

[11] Patent Number: 5,984,434
[45] Date of Patent: Nov. 16, 1999

[54] BRAKING CONTROL SYSTEM FOR A MOTOR VEHICLE

[75] Inventor: Hideyuki Aizawa, Susono, Japan

[73] Assignee: Toyota Jidosha Kabushiki Kaisha, Toyota, Japan

[21] Appl. No.: 09/057,435

[22] Filed: Apr. 9, 1998

[30] Foreign Application Priority Data

Apr. 18, 1997 [JP] Japan ................................. 9-101745

[51] Int. Cl.$^6$ ........................................................ B60T 8/72
[52] U.S. Cl. .............................................. 303/174; 701/74
[58] Field of Search ........................... 180/197; 303/156, 303/166, 167, 171, 173, 174, 187; 701/74, 78; 364/426.018, 426.024, 426.027, 426.028

[56] References Cited

U.S. PATENT DOCUMENTS

| 4,787,682 | 11/1988 | Muto ........................................ 303/173 |
| 5,181,174 | 1/1993 | Matsuda et al. ........................... 701/82 |
| 5,185,702 | 2/1993 | Okubo ....................................... 701/75 |
| 5,240,313 | 8/1993 | Yoshino et al. .......................... 303/186 |
| 5,303,988 | 4/1994 | Okubo ....................................... 303/156 |
| 5,414,628 | 5/1995 | Yoshino ..................................... 701/74 |
| 5,428,540 | 6/1995 | Okubo ....................................... 701/74 |
| 5,430,652 | 7/1995 | Fujioka ..................................... 701/74 |

FOREIGN PATENT DOCUMENTS

50-7231 3/1975 Japan .

*Primary Examiner*—Chris Schwartz
*Attorney, Agent, or Firm*—Oliff & Berridge, PLC

[57] ABSTRACT

The pressure increases of a hydraulic pressure control module for controlling the braking forces of wheels are decided on the basis of wheel speeds and a vehicle speed estimated from the maximum wheel speed. In this case, on condition that the incremental rate of the vehicle speed exceeds a predetermined threshold value, the vehicle speed exhibited before the incremental rate exceeds the threshold value is kept as an estimated vehicle speed, which is used for deciding the pressure increases. Thus, the pressure increases can be appropriately decided even in a situation where a motor vehicle passes through a very-low-$\mu$ road part or a drop in road level.

3 Claims, 6 Drawing Sheets

INTERMEDIATE PRESSURE INCREASE MODES (pointing to rows 4 and 5)

| | MODES | | SWITCHOVER VALVES | | |
|---|---|---|---|---|---|
| | FRONT WHEEL | REAR WHEEL | 1ST | 2ND | 3RD |
| 1 | M/C PRESSURE INCREASE | M/C PRESSURE INCREASE | O | O | X |
| 2 | M/C PRESSURE INCREASE | HOLD | O | X | X |
| 3 | M/C PRESSURE INCREASE | PRESSURE DECREASE | O | X | O |
| 4 | PUMP PRESSURE INCREASE | PUMP PRESSURE INCREASE | X | O | X |
| 5 | PUMP PRESSURE INCREASE | HOLD | X | X | X |
| 6 | PUMP PRESSURE INCREASE | PRESSURE DECREASE | X | X | O |
| 7 | PRESSURE DECREASE | PRESSURE DECREASE | X | O | O |

O --- OPEN
X --- CLOSED

BRAKING CONTROL SYSTEM FOR A MOTOR VEHICLE

BACKGROUND OF THE INVENTION

1. Field of the Invention

The present invention relates to a braking control system for a motor vehicle. More particularly, it relates to braking control technology in which the pressure increase of a hydraulic pressure control module for controlling the braking force of each wheel is appropriately decided or judged.

2. Description of the Prior Art

There have heretofore been known vehicular braking control systems each of which is furnished with automatic braking control means for automatically controlling the braking forces of individual wheels, utilizing wheel speeds obtained from wheel speed sensors mounted on the respective wheels.

In executing such a braking control for a motor vehicle, inevitably both the vehicle speed (the ground speed) of the motor vehicle and the wheel speeds mentioned above need to be detected at high precisions by reason that the increases or decreases of the pressures of the hydraulic pressure control module for controlling the braking forces of the wheels are decided or judged in accordance with the lock or slip states of the wheels.

By way of example, the official gazette of Japanese Patent Application Publication No. 7231/1975 discloses the vehicular braking control system in which the vehicle speed is estimated from the maximum one of the wheel speeds of the four wheels, whereupon the braking forces of the wheels are controlled on the basis of the comparisons between the estimated vehicle speed and the wheel speeds of the respective wheels.

In the prior art, whether or not the pressure is to be increased is decided or judged by checking theslip state in view of the difference between the estimated vehicle speed and each wheel speed. In this regard, the wheel speed sometimes rises or falls suddenly due to the change of a road surface condition. However, since the vehicle speed does not change so suddenly as the wheel speed, the estimated vehicle speed which is based on only the information of the maximum wheel speed can deviate greatly from the actual vehicle speed of the motor vehicle. In order to avoid this drawback, the vehicle speed is estimated with a predetermined guard value taken into account for the maximum wheel speed. The guard value is set at a comparatively large value in consideration of a low-$\mu$ road (where symbol $\mu$ denotes a friction factor).

The above contrivance, however, is not satisfactory yet. More specifically, in such a case where, even during its drive on a high-$\mu$ road, the motor vehicle descends along a drop in road level or passes through a very-low-$\mu$ road part, the wheel cannot receive the reaction force of the surface of the road, and the wheel speed falls once. Thereafter, when the wheel comes to receive the reaction force of the road surface on a high-$\mu$ part again, abrupt rise in the wheel speed occurs temporarily. In the case of estimating the vehicle speed from the maximum wheel speed, therefore, the estimated vehicle speed sometimes becomes apparently higher than the actual vehicle speed.

In a case where such a situation is to be coped with in accordance with the idea of the guard value in the prior art, it might be thought out to set the guard value small. The guard value in the prior art, however, has the basic concept that "the actual vehicle speed can never rise abruptly in excess of the guard value". Accordingly, it is naturally limited to lower the guard value. That is, in the light of the aim thereof, the guard value in the prior art is not set much lower than the value to which the vehicle speed may possibly rise in actuality.

Meanwhile, even when the wheel speed has changed due to the temporary change of the road surface condition, actually the vehicle speed hardly changes in many cases. With the guard value, accordingly, it is not in rare cases that the vehicle speed is estimated somewhat higher than in actuality.

On this occasion, in the case where the slip state is judged from the difference between the estimated vehicle speed and each wheel speed, the vehicular braking control system incurs the problem that, in correspondence with the higher estimative component of the vehicle speed, the pressure increase is not judged necessary in spite of being actually required, so the operation of increasing the pressure cannot be started (the braking force cannot be intensified).

SUMMARY OF THE INVENTION

The present invention has been made in view of the problem of the prior art as stated above, and it has for its object to provide a braking control system for a motor vehicle which can appropriately decide pressure increases.

Figure 1:
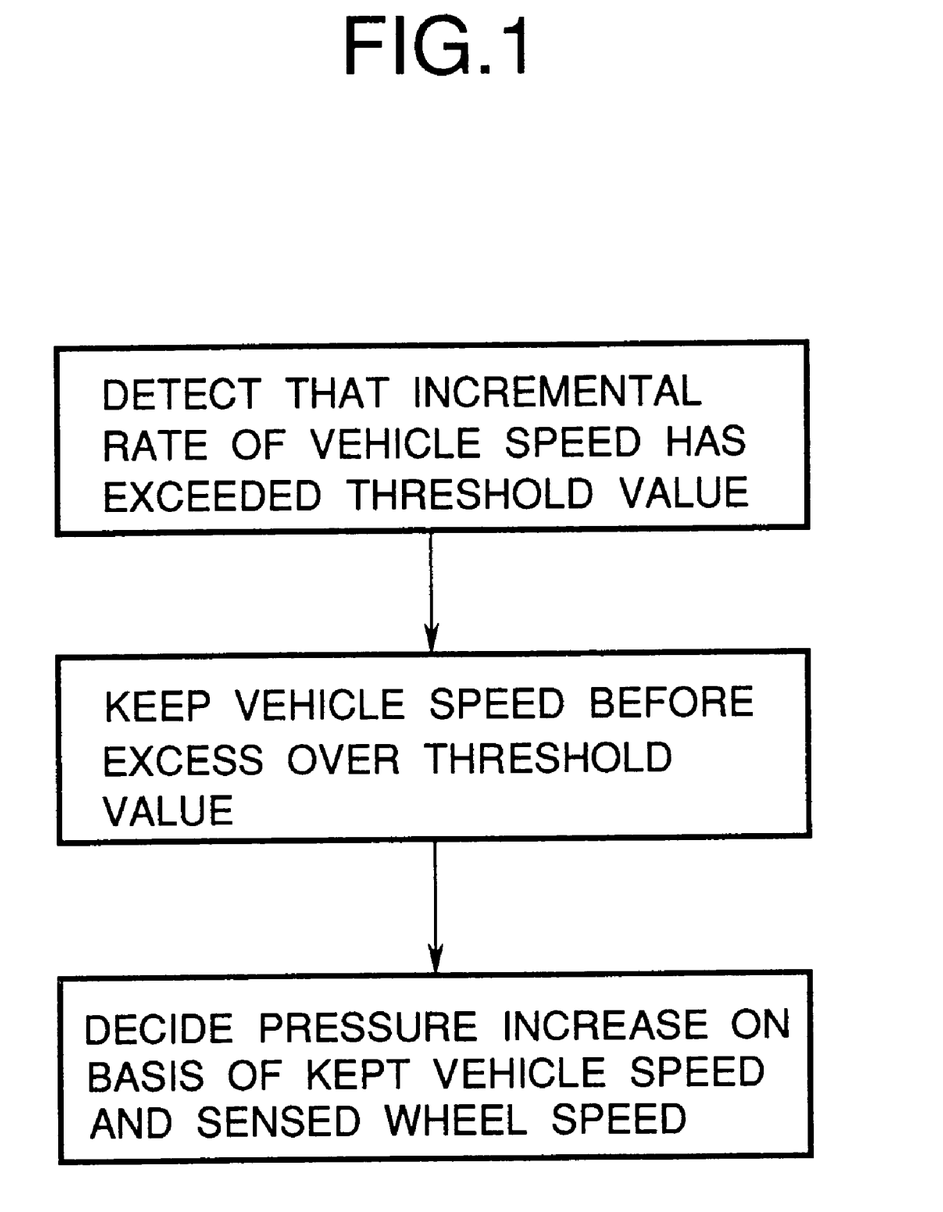
FIG. 1 is a block diagram showing the purport of the present invention.

In a braking control system for a motor vehicle to which the present invention is applied, a vehicle speed is estimated from a maximum one of wheel speeds which are obtained from wheel speed sensors mounted on respective wheels, and pressure increases of a hydraulic pressure control module for controlling braking forces of the wheels are decided on the basis of the vehicle speed and the wheel speeds. As has its purport illustrated in FIG. 1, the present invention detects whether or not an incremental rate of the vehicle speed has exceeded a predetermined threshold value. Subsequently, on condition that the incremental rate has exceeded the threshold value, the vehicle speed before the excess over the threshold value is kept as the estimated vehicle speed. Further, on condition that the estimated vehicle speed is kept, the pressure increases are decided on the basis of the estimated vehicle speed and the wheel speeds.

The present invention has been made with note taken of the fact that a situation where a wheel speed becomes abruptly higher than an estimated vehicle speed exhibited till then, during a braking control, arises substantially only in a case where a wheel is temporarily affected by the rapid change of a road surface condition. Especially during an ABS (antiskid brake system) control, a tendency toward the above situation is conspicuous because of the state in which none of wheels receives a driving force from an engine. On such an occasion, accordingly, the estimated vehicle speed should not be raised in accordance with the idea of a guard value in the prior art, but it should most properly be kept at its value exhibited then.

In this way of thinking, the present invention is so constructed that, when the incremental rate of the vehicle speed has exceeded a predetermined threshold value, the vehicle speed before the excess over the threshold value is kept. It is therefore preventable that, the vehicle speed is estimated higher than an actual one so that the timing of a pressure increase is lost. As a result, the pressure increase can be appropriately decided to accomplish a reasonable braking control.

The present invention is also applicable to an acceleration slip control by appropriately setting predetermined values (the acceleration slip control can be incarnated more powerfully than in the prior art).

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Now, one aspect of performance of the present invention will be described in detail with reference to the drawings.

Figure 2:
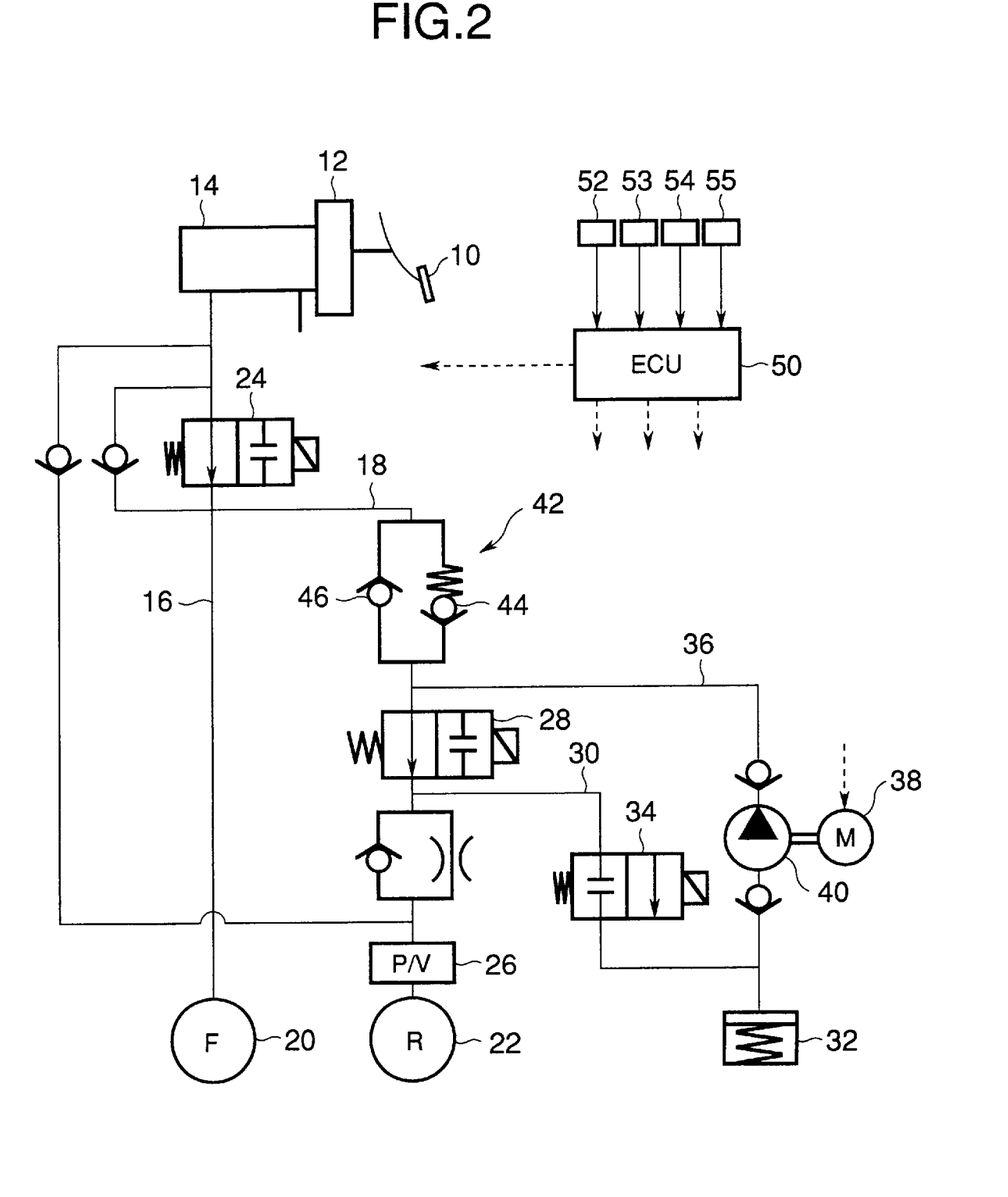
FIG. 2 is a hydraulic circuit diagram showing the outline of a braking control system for a motor vehicle to which the present invention is applied.

FIG. 2 is a hydraulic circuit diagram showing the outline of a braking control system for a motor vehicle to which the present invention is applied. The example who illustrated in FIG. 2 is an antilock brake system of diagonal dual-system type (in FIG. 2, however, only one of the two systems thereof is depicted, and the other system is omitted).

Referring to FIG. 2, numeral 10 designates a brake pedal, and numeral 12 a booster which amplifies a tread force on the brake pedal 10. Numeral 14 designates a master cylinder to which the amplified tread force is transmitted so as to generate a hydraulic pressure. The hydraulic pressure generated in the master cylinder 14 is transmitted to the wheel cylinder 20 of a front wheel through the brake passage 16 thereof, and to the wheel cylinder 22 of a rear wheel through the brake passage 18 thereof.

A first switchover valve (master cutoff valve) 24 being normally open is incorporated in that part of the front-wheel brake passage 16 which is near to the master cylinder 14 with respect to the node or connection position of the rear-wheel brake passage 18. During a braking control (during an ABS control in the exemplified aspect of performance), the first switchover valve 24 is closed to cut off the communications between the master cylinder 14 and the wheel cylinders 20, 22 of the front and rear wheels. Besides, a P valve (proportioning valve) 26 is incorporated in the rear-wheel brake passage 18.

A second switchover valve 28 being normally open is incorporated in that part of the rear-wheel brake passage 18 which is near to the master cylinder 14 with respect to the node of the P valve 26. Besides, a reservoir passage 30 is connected to that part of the rear-wheel brake passage 18 which lies between the node of the second switchover valve 28 and that of the P valve 26. The reservoir passage 30 is extended from a reservoir 32, and a third switchover valve 34 being normally closed is mounted midway of this passage 30.

A pump passage 36 is also extended from the reservoir 32. A pump 40 which is driven by an electric motor 38 is mounted midway of the pump passage 36. The pump 40 draws a brake fluid from the reservoir 32. The port of the pump passage 36 for discharging the brake fluid is connected to that part of the rear-wheel brake passage 18 which is near to the master cylinder 14 with respect to the node of the second switchover valve 28.

A check valve assembly 42 is incorporated in that part of the rear-wheel brake passage 18 which is near to the master cylinder 14 with respect to the node of the pump passage 36. The check valve assembly 42 is so constructed that a first check valve 44 the opening pressure of which is not substantially zero, and a second check valve 46 the opening pressure of which is substantially zero, are connected in reverse direction to each other and in parallel with each other.

An electronic control unit (ECU) 50 is mainly constructed of a computer etc. which include a CPU, a ROM, a RAM and a bus. The ECU 50 controls the open and closed states of the switchover valves 24, 28 and 34. In addition, the ECU 50 is connected with wheel speed sensors 52, 53, 54 and 55 which detect the wheel speeds of respectively corresponding wheels. Thus, the ECU 50 functions as automatic braking control means for controlling the switchover valves 24, 28 and 34 on the basis of signals delivered from the sensors 52~55.

Figure 3:
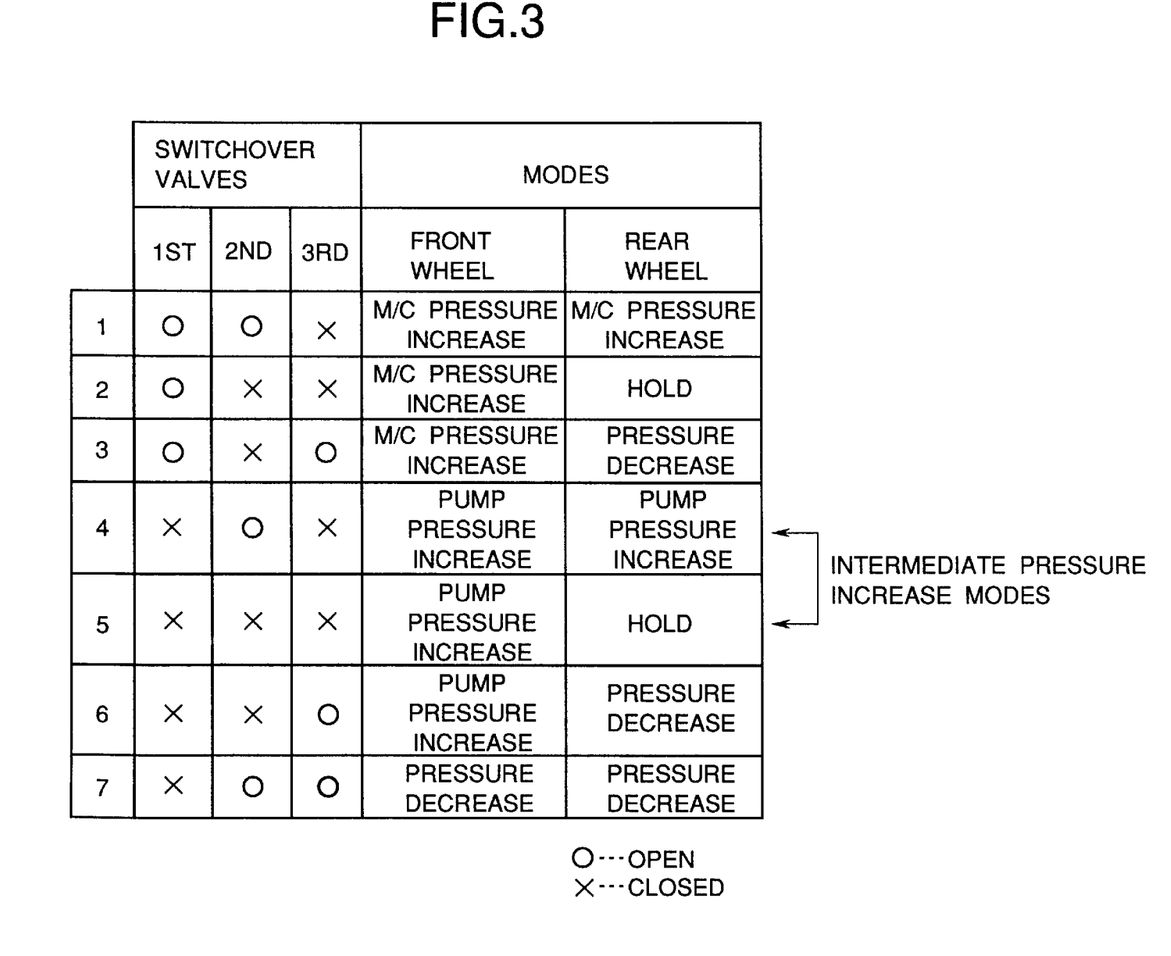
FIG. 3 is a table showing modes which are realizable in the aspect of performance exemplified in FIG. 2.

Modes which can be realized by combining the open and closed states of the switchover valves 24, 28 and 34, are of seven sorts as tabulated in FIG. 3.

Referring to FIG. 3, marks ○ and X denote the open state and closed state of the first switchover valve 24, second switchover valve 28 or third switchover valve 34, respectively. An expression "M/C pressure increase" signifies an ordinary pressure increase in which a pressure is increased with the master cylinder 14 as an oil pressure source when the brake pedal 10 has been trodden. On the other hand, an expression "pump pressure increase" signifies a pressure increase in which a pressure is increased with the pump 40 and reservoir 32 as an oil pressure source during the braking control.

As stated before, the brake system in this aspect of performance is of the diagonal dual-system type. When the occurrence of a tendency to lock has been decided for at least either of the front wheel and rear wheel in each of the two diagonal systems (for the right front wheel and left rear wheel by way of example), this brake system determines which of a pressure decrease request, a pressure holding request and a pressure increase request is to be issued, with respect to every wheel on the basis of the rotating situation thereof. That is, among the seven sorts of modes indicated in FIG. 3, ones matching with the hydraulic pressure control requests which have been respectively determined for the front wheel and rear wheel are determined and executed as the modes of the current control cycle.

The individual modes will be explained below.

In a case where the tendency to lock has firstly occurred in the front wheel, the seventh mode is selected for decreasing the brake pressure of the front wheel. This mode decreases the brake pressures of both the front and rear wheels.

In a case where the tendency of the front wheel to lock has come to disappear in consequence of the decrease of the front-wheel brake pressure, any of the fourth~seventh modes is selected in accordance with the subsequent lock tendencies of the front and rear wheels.

In the fourth mode, both the first switchover valve 24 and the third switchover valve 34 are closed, and only the second switchover valve 28 is opened. Accordingly, the brake fluid discharged from the pump 40 is supplied to the wheel cylinder 20 of the front wheel via the first check valve 44, and the front-wheel brake pressure is increased. On the other hand, the brake fluid is also supplied to the wheel cylinder 22 of the rear wheel via the second switchover valve 28 as well as the P valve 26, with the result that the rear-wheel brake pressure is also increased. That is, the fourth mode implements the pump pressure increases for both the wheels.

In the fifth mode, all of the first, second and third switchover valves 24, 28 and 34 are closed. Therefore, the brake fluid discharged from the pump 40 is not supplied to the wheel cylinder 22 of the rear wheel, and it is supplied only to the wheel cylinder 20 of the front wheel via the first check valve 44. That is, the fifth mode implements the pump pressure increase for the front wheel and the pressure holding for the rear wheel.

In the sixth mode, the first and second switchover valves 24 and 28 are closed, and only the third switchover valve 34 is opened. Therefore, the brake fluid discharged from the pump 40 is supplied to the wheel cylinder 20 of the front wheel, while the brake fluid of the wheel cylinder 22 of the rear wheel flows back to the reservoir 32 via the third switchover valve 34. That is, the sixth mode implements the pump pressure increase for the front wheel and the pressure decrease for the rear wheel.

The first~third modes are ordinary M/C pressure increase modes in each of which the first switchover valve 24 is opened to supply the brake fluid from the master cylinder 14 to the wheel cylinder 20 of the front wheel. During the braking control of the front wheel, accordingly, only the fourth~seventh modes are executed, and the first~third modes are not executed.

However, in a case where a pressure increase is still necessary even after the pump 40 has drawn all the brake fluid in the reservoir 32 and has emptied the reservoir 32 during the braking control, the mode under execution is properly changed over to any of the first~third modes, in which the first switchover valve 24 is opened so as to increase the brake pressure by the brake fluid supplied from the master cylinder 14.

In a case where the tendency to lock has firstly occurred in the rear wheel, only the rear-wheel brake pressure may be decreased so that the third mode is firstly executed, thereafter a selected one of the first~seventh modes is executed.

Now, the operation of this aspect of performance will be described in conjunction with the flow charts of FIGS. 4~6.

Figure 4:
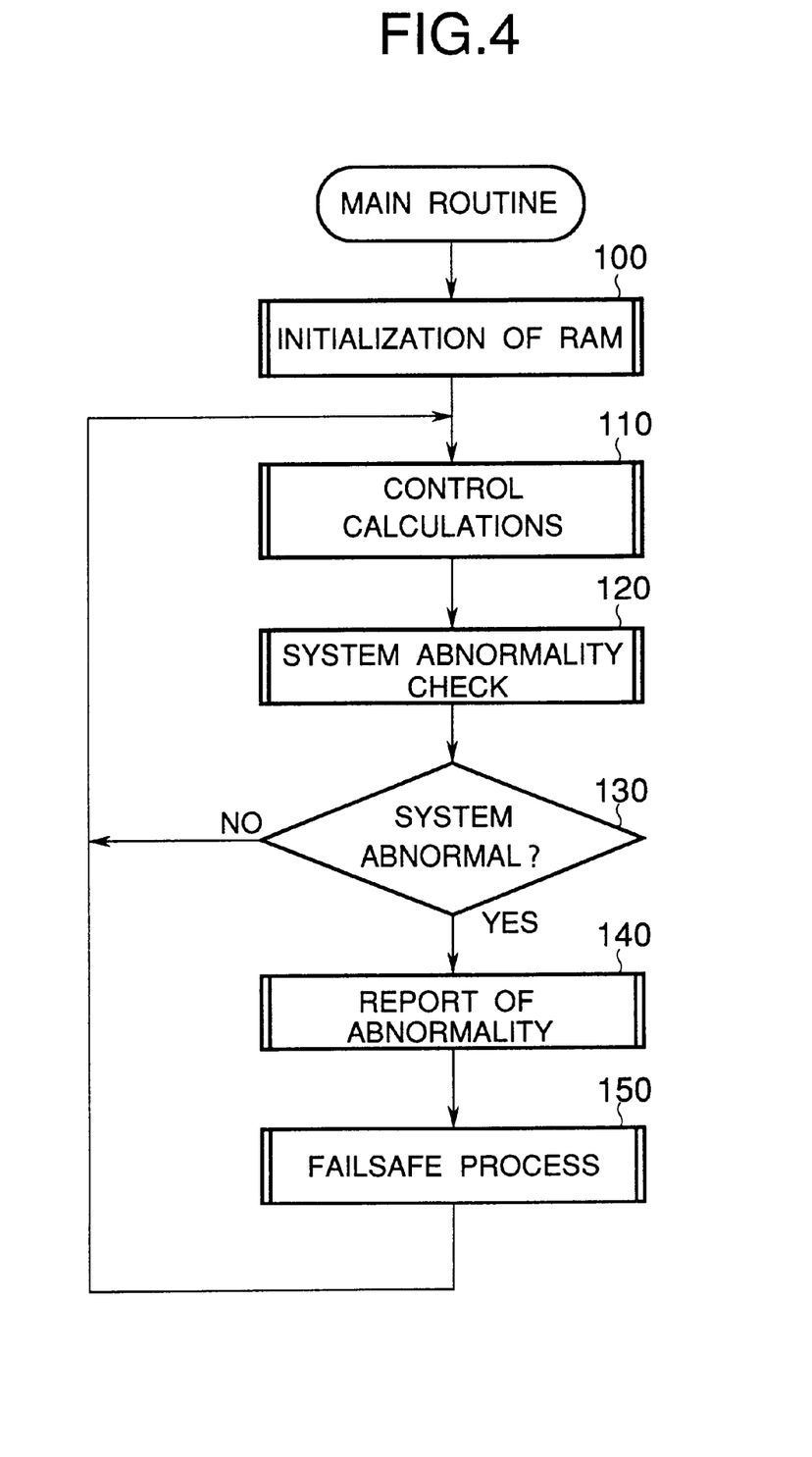
FIG. 4 is a flow chart showing the main routine of a control in the exemplified aspect of performance.

The flow chart of FIG. 4 illustrates the main routine of a control according to this aspect of performance. The control is started simultaneously with the turn-ON of an IG (ignition) switch.

The RAM included in the ECU 50 is initialized at a step 100 in FIG. 4, and a process for several control calculations is executed at the next step 110. In this aspect of performance, the calculation process as shown in FIG. 5 (to be explained later) is executed when the brake pedal 10 has been trodden. A system abnormality check is carried out at a step 120. On condition that the system has been judged abnormal at a step 130, the abnormality is reported at the next step 140, and a failsafe process is executed at a step 150. The step 150, and the step 130 in the absence of any system abnormality are followed by the step 110.

Next, there will be explained the control calculation process which is executed when the brake pedal 10 has been trodden.

Figure 5:
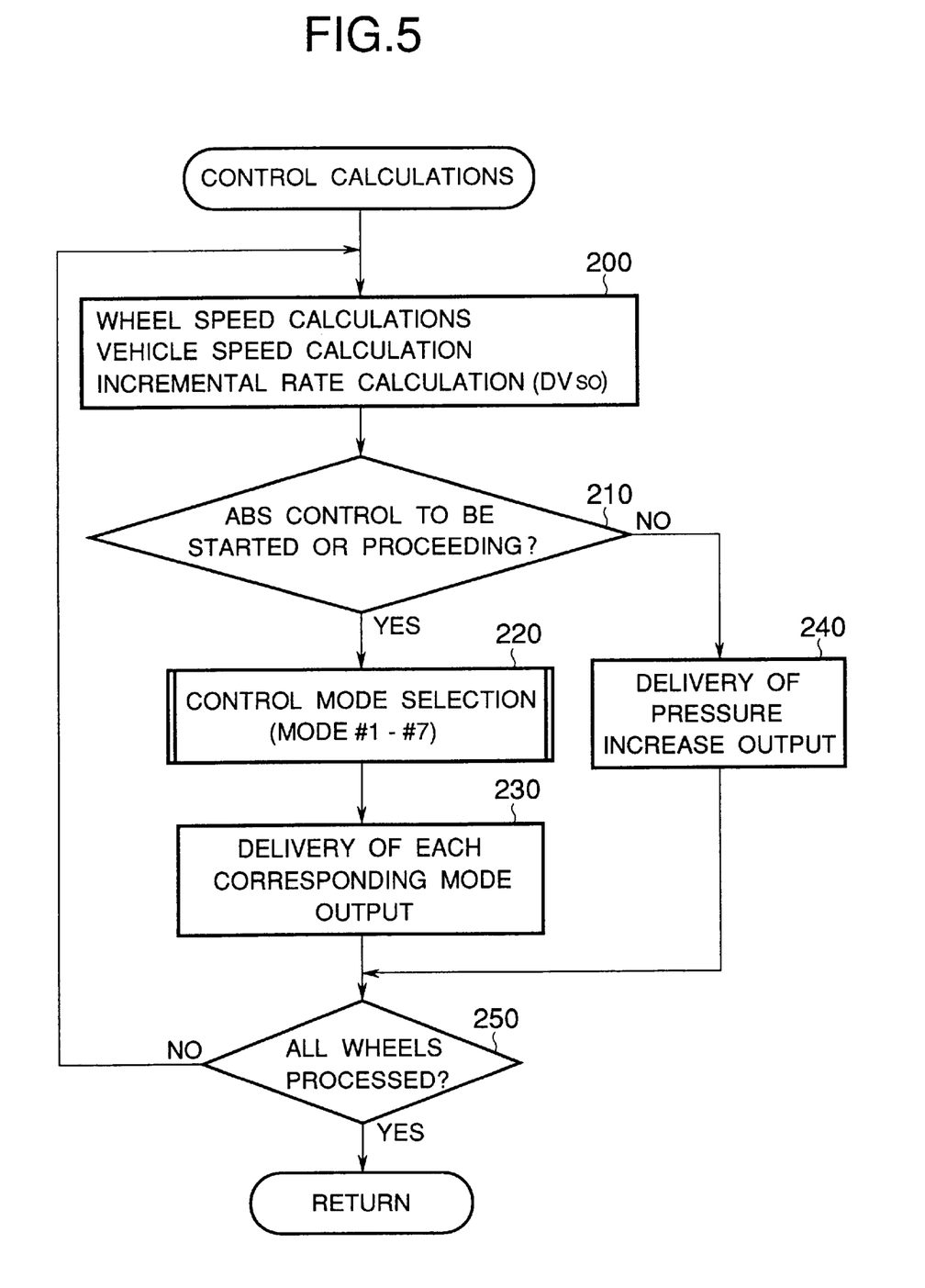
FIG. 5 is a flow chart showing a control calculation process in the exemplified aspect of performance.

At a step 200 in FIG. 5, the vehicle speed Vs0 is estimated from the maximum wheel speed on the basis of signals delivered from the wheel speed sensors 52., 53, 54 and 55. Further, the incremental rate DVs0 of the, vehicle speed Vs0 is calculated.

A step 210 serves to judge if the braking control (ABS control) is to be started or is proceeding. On condition that the braking control is neither to be started nor proceeding, the flow of the process advances to a step 240 at which the ordinary brake control based on a pressure increase by the master cylinder 14 is executed, and which is followed by a step 250.

Figure 6:
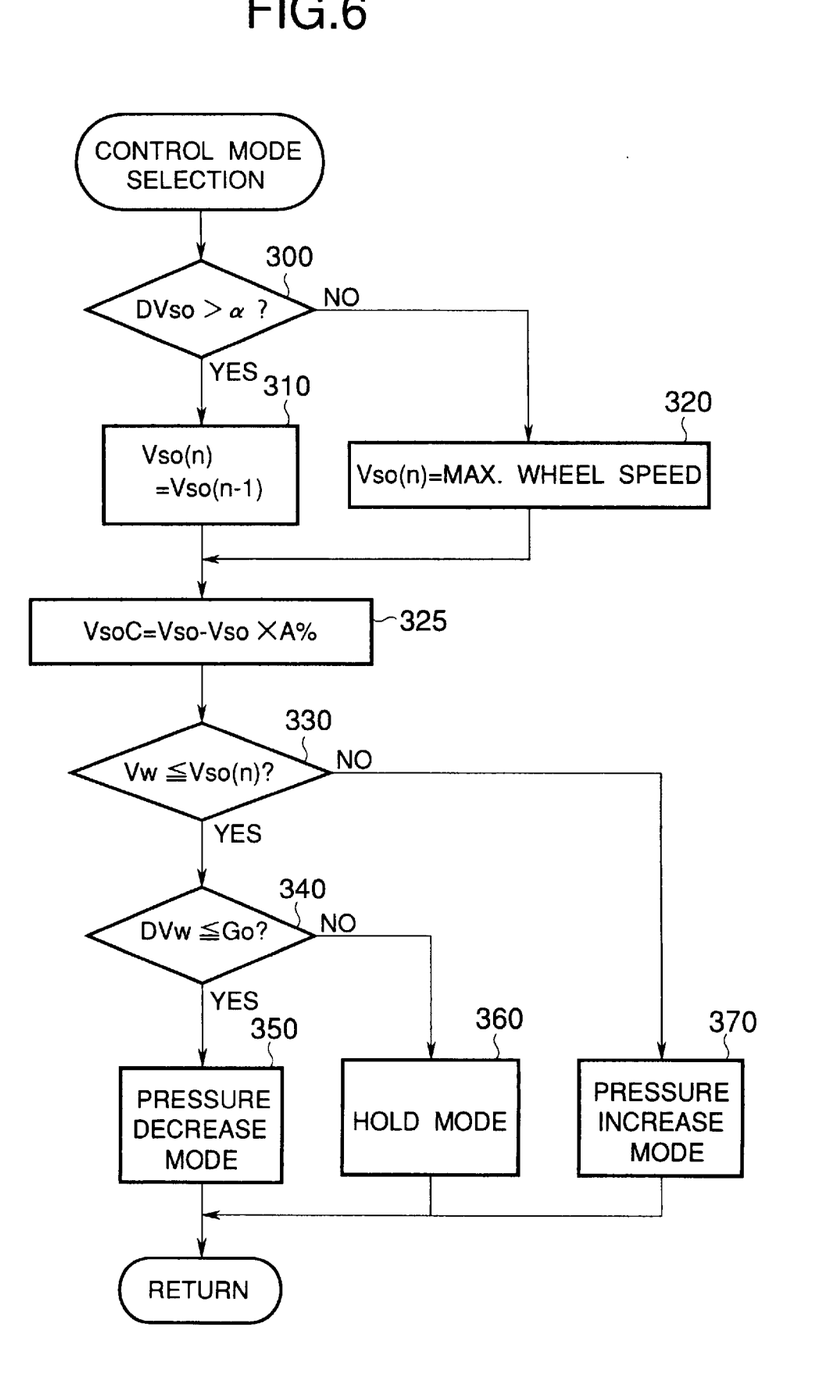
FIG. 6 is a flow chart showing a control mode selection process in the exemplified aspect of performance.

On condition that the braking control is to be started or is proceeding, a process for control mode selection to be explained later with reference to FIG. 6 is executed at a step 220. Herein, the control modes of the respective wheels are selected from among the modes #1~#7 indicated in FIG. 3. The selected modes are outputted at the next step 230. The step 250 serves to decide whether or not all of the four wheels have been processed. When all the wheels have been processed, the control calculation process is ended, and when not, the flow of this process is returned to the step 200.

The flow chart of FIG. 6 illustrates the process which is executed when the braking control is to be started or is proceeding, and which selects the control modes of the respective wheels from among the first~seventh modes.

In this aspect of performance, the vehicle speed Vs0 is estimated from the maximum one of the wheel speeds Vw which are usually obtained from the wheel speed sensors 52, 53, 54 and 55.

A step 300 in FIG. 6 serves to decide whether or not the incremental rate DVs0 of the vehicle speed Vs0 is greater than a predetermined threshold value α. Here, in a case where the incremental rate DVs0 of the vehicle speed Vs0 is greater than the threshold value α, it is judged that the vehicle speed Vs0 has risen abnormally, and a value exhibited before the vehicle speed Vs0 exceeds the threshold value α is kwet. That is, at a step 310, the vehicle speed Vs0(n) in the current control cycle is set to the same value of the vehicle speed Vs0(n−1) in the last control cycle.

On the other hand, in a case where the decision of the step 300 is that the incremental rate DVS0 of the vehicle speed Vs0 is not greater than the threshold value α, the vehicle speed Vs0(n) is estimated from the maximum wheel speed on that time as usual at a step 320.

Subsequently, at a step 325, a pressure decrease reference speed VsoC for use in the decision of the slip state of the wheel is calculated as Vs0C=Vs0−Vs0×A%. Here, A% denotes a correction component with the difference of tire diameters taken into consideration, and it is usually 10% or so.

At the next step 330, the wheel speed Vw of each wheel is compared with the pressure decrease reference speed Vs0C. On condition that the wheel speed Vw is equal to or less than the pressure decrease reference speed Vs0C, a wheel acceleration DVw corresponding to the wheel speed Vw is compared with a predetermined value G0 at the next step 340. The predetermined value G0 functions to prevent the wheel speed Vw from changing abruptly. In a case where the wheel acceleration DVw is greater than the predetermined value G0, the brake pressure of the wheel cylinder is held. More specifically, when the wheel acceleration DVw is not greater than the predetermined value G0, the pressure decrease mode is selected at a step 350, and when the former DVw is greater than the latter G0, the pressure holding mode is selected (the pressure decrease mode is suspended) at a step 360.

Besides, on condition that the wheel speed Vw is greater than the pressure decrease reference speed Vs0C as the decision of the step 330, the pressure increase mode (pump pressure increase) is selected at a step 370.

Thus, any of the modes #1~#7 in FIG. 3 is selected in correspondence with the wheel which is being currently judged. By way of example, in a case where the pressure increase mode has been selected for the right front wheel at the step 370 and where the pressure decrease mode has been subsequently selected for the left rear wheel at the step 350, the sixth mode in FIG. 3 is selected.

According to this aspect of performance, even in such a case where the motor vehicle has had the incremental rate DVs0 of the vehicle speed Vs0 enlarged suddenly after passing through a very-low-μ road part or descending along a drop in road level, the vehicle speed Vs0 exhibited before the incremental rate DVs0 thereof exceeds the predetermined threshold value α is kept so as to prevent the vehicle speed Vs0 from being estimated higher than an actual value. It is therefore permitted to appropriately judge the timing of the pressure increase.

Incidentally, such a control for keeping the vehicle speed Vs0 is executed only in the case where the incremental rate DVs0 thereof has exceeded the predetermined threshold value α. Insofar as the threshold value a is not exceeded, the vehicle speed Vs0 is estimated from the maximum wheel speed as usual.

In the prior art, in a case where the maximum wheel speed changes abnormally, a guard value is set in order to reasonably estimate a vehicle speed. Even when the guard value is set smaller, the vehicle speed might be erroneously estimated by reason that the actual vehicle speed hardly changes when the motor vehicle passes through the very-low-μ road part or descends along the drop in road level. The aspect of performance of the present invention consists, so to speak, in dispensing with the guard value and keeping the vehicle speed exhibited before the detection of the abnormal value. As a result, it is permitted to estimate the vehicle speed more accurately and to decide the pressure increase exactly.

Besides, in the case where the brake pressure is increased by the pump 40 drawing the brake fluid from the reservoir 32, during the braking control in any of the fourth~sixth modes, the mode is changed over to any of the first~third modes when the reservoir 32 has been emptied, so as to open the first switchover valve 24 for a pressure increase by the master cylinder 14. On the occasion of the changeover, in the prior art, the pressure increase is decided again, whereupon the first switchover valve 24 is opened. In this regard, the pressure increase can be appropriately decided when the control for keeping the vehicle speed according to the present invention is applied to the decision of the pressure increase. As a result, the first switchover valve 24 can be reliably opened at need, and a deceleration can be prevented from becoming somewhat insufficient.

As described above, according to the present invention, a pressure increase can be appropriately decided, a necessary vehicle deceleration can be ensured, and a good braking control can be executed.

What is claimed is:

1. A braking control system for a motor vehicle wherein a vehicle speed is estimated from a maximum one of wheel speeds which are obtained from wheel speed/sensors mounted on respective wheels, and wherein pressure control of a hydraulic pressure control module for controlling braking forces of the wheels are executed on the basis of the estimated vehicle speed and the wheel speeds, comprising:

means for detecting whether or not an incremental rate of said vehicle speed has exceeded a predetermined threshold value;

means for keeping said vehicle speed before the excess over the threshold value, as the estimated vehicle speed on condition that said incremental rate has exceeded said threshold value; and means for deciding pressure increases in said pressure control on the basis of said estimated vehicle speed and said wheel speeds on condition that said estimated vehicle speed is kept.

2. A braking control system for a motor vehicle as defined in claim 1, further comprising means for setting a pressure decrease reference speed based on the estimated vehicle speed, wherein pressure decreases in said pressure control are executed on the basis of the pressure decrease reference speed and the wheel speeds.

3. A braking control system for a motor vehicle as defined in claim 2, further comprising means for calculating wheel accelerations from said wheel speeds, wherein when the wheel acceleration is less than a predetermined threshold value, said pressure decrease is suspended.

* * * * *